United States Patent

Norrell et al.

[11] Patent Number: 6,084,883
[45] Date of Patent: Jul. 4, 2000

[54] EFFICIENT DATA TRANSMISSION OVER DIGITAL TELEPHONE NETWORKS USING MULTIPLE MODULUS CONVERSION

[75] Inventors: Andrew L. Norrell; Scott A. Lery, both of Nevada City, Calif.

[73] Assignee: 3Com Corporation, Skokie, Ill.

[21] Appl. No.: 08/944,461

[22] Filed: Oct. 6, 1997

Related U.S. Application Data

[63] Continuation-in-part of application No. 08/888,201, Jul. 7, 1997, Pat. No. 5,995,548
[60] Provisional application No. 60/030,843, Nov. 15, 1996.

[51] Int. Cl.$^7$ .................................................... H04L 12/28
[52] U.S. Cl. ............................ 370/420; 370/477; 375/295
[58] Field of Search ................................... 370/420, 463, 370/477, 476, 458; 375/259, 295, 316, 340

[56] References Cited

U.S. PATENT DOCUMENTS

| | | | |
|---|---|---|---|
| 4,882,726 | 11/1989 | Lang et al. | |
| 4,891,774 | 1/1990 | Bradley | 364/703 |
| 4,941,154 | 7/1990 | Wei | |
| 5,051,988 | 9/1991 | Kawahigashi et al. | 370/476 |
| 5,103,227 | 4/1992 | Betts | 341/61 |
| 5,111,162 | 5/1992 | Hietala et al. | 332/127 |
| 5,185,763 | 2/1993 | Krishnan | 375/39 |
| 5,230,010 | 7/1993 | Betts et al. | 375/39 |
| 5,280,503 | 1/1994 | Betts et al. | 375/121 |
| 5,406,583 | 4/1995 | Dagdeviren | 345/5 |
| 5,428,641 | 6/1995 | Long | 375/295 |
| 5,465,273 | 11/1995 | Cole | 375/296 |
| 5,528,595 | 6/1996 | Walsh et al. | 370/85.13 |
| 5,577,105 | 11/1996 | Baum et al. | 379/93 |
| 5,598,435 | 1/1997 | Williams | 375/261 |
| 5,659,578 | 8/1997 | Alamouti et al. | 375/261 |
| 5,801,695 | 9/1998 | Townshend | |
| 5,809,075 | 9/1998 | Townshend | |
| 5,835,538 | 11/1998 | Townshend | |
| 5,859,572 | 1/1999 | Townshend | |

FOREIGN PATENT DOCUMENTS

| | | |
|---|---|---|
| 0634856A2 | 1/1995 | European Pat. Off. |
| 0725487A2 | 8/1996 | European Pat. Off. |
| WO9119362A | 12/1991 | WIPO |
| WO9217972A | 3/1992 | WIPO |
| WO9618261A | 12/1995 | WIPO |

(List continued on next page.)

OTHER PUBLICATIONS

P.A. Humblet and M.G. Troulis, "The Information Driveway," IEEE Communications Magazine, Dec. 1996, pp. 64–68.

(List continued on next page.)

*Primary Examiner*—Hassan Kizou
*Assistant Examiner*—Daniel Previl
*Attorney, Agent, or Firm*—McDonnell Boehnen Hulbert & Berghoff

[57] ABSTRACT

A method of encoding data into a digital sequence to be transmitted over the DTN so as to cause the DTN's codec to generate a multiple modulus M-ary signal in a manner that will facilitate efficient data transmission and recovery (decoding) by the distant end receiver, even in the presence of robbed-bit signaling (RBS). The preferred embodiments provide an apparatus and method of converting blocks of binary data to a corresponding block of $M_1$-ary, $M_2$-ary, ..., $M_n$ symbols using Multiple Modulus Conversion (MMC) to maximize the data rate, while minimizing the required Signal-to-Noise Ratio (SNR) to achieve a desired error rate, in a system having a transmitter connected to the DTN via direct digital access and a receiver connected over a conventional analog subscriber line. A subset of codec codewords is used to represent the M-ary signals. For each time slot (symbol time) one of M separate octets are selected for transmission by the encoder, and the encoder's output is sent through the DTN to a subscriber loop codec. The value of M can vary among the different time slots. The analog output of the codec corresponds to M-level, or M-ary pulse amplitude modulation, because each of the transmitted octets is converted to one of M analog voltages at the DTN's codec before being communicated over the subscriber loop.

11 Claims, 5 Drawing Sheets

FOREIGN PATENT DOCUMENTS

| | | |
|---|---|---|
| WO 96/18261 | 6/1996 | WIPO . |
| WO9808329A | 2/1998 | WIPO . |
| WO 98/20656 | 5/1998 | WIPO . |
| WO 98/37657 | 8/1998 | WIPO . |

OTHER PUBLICATIONS

International Searach Report for PCT Application Serial No. PCT/US 98 04087.

Hodgkiss B; "DSP Implementation Considerations in High–Speed Telephone Modems," DSP '97 Conference Proceedings, Proceedings of DSP '97, Esher, UK, Dec. 3–4, 1997, Dec. 3, 1997, Kingston Upon Thames, UK, Badger Events, UK, pp. 77–84, XP000199773.

Kalet I et al: "The Capacity of PCM Voiceband Channels," Proceedings of the International Conference on Communications (ICC), Geneva, May 23–26, 1993, vol. 1 May 23, 1993, Institute of Electrical and Electronics Engineers, pp. 507–511, XP000371143.

Anonymous: "Queue Analysis of Incoming and Outgoing T1 Signalling Bits" IBM Technical Disclosure Bulletin, vol. 32, No. 7, Dec. 1989, New York, US, pp. 358–362, XP002067700.

Vedat Eyuboglu, M. et al. "Advanced Modulation Techniques for V.Fast," European Transactions on Telecommunications and Related Technologies, vol. 4, No. 3, May 1, 1993, Milano, Italy, pp. 243–256, XP00385751, see p. 247, paragraph 4.1, see figures 2,A1.

"Modem Operating At Data Signalling Rates Of Up To 28,800 Bit/s For Use On The General Switched Telephone Network And On Leased Point–To–Point 2–Wire telephone–Type Circuits," ITU–T Recommendation V.34, Sep. 1994, Geneva, XP002067701 cited in the application, see p. 18, paragraph 9.4—p. 20, paragraph 9.5.

EFFICIENT DATA TRANSMISSION OVER DIGITAL TELEPHONE NETWORKS USING MULTIPLE MODULUS CONVERSION

RELATED APPLICATIONS

This application claims the benefit under 35 U.S.C. §119 (e) of U.S. Provisional Patent Application Ser. No. 60/030, 843, filed Oct. 15, 1996, entitled "Efficient Data Transmission Over Digital Telephone Networks using Multiple Modulus Conversion" for all common subject matter disclosed therein; this application is a CIP of and claims the benefit under 35 U.S.C. §120 of U.S. patent application Ser. No. 08/888,201, filed Jul. 7, 1997, now U.S. Pat. No. 5,995,548 entitled "Improved Signaling Method Using Multiple Modulus Shell Mapping" for all common subject matter disclosed therein.

BACKGROUND OF THE INVENTION

This invention relates to data communication over Digital Telephone Networks (DTN). In particular, the invention relates to a signaling system used in a data distribution system that consists of a data source, or server, directly connected to the DTN, without any Analog-to-Digital (A/D) conversion or Digital-to-Analog (D/A) conversion, and at the receiving end, a client, or subscriber, connected to a DTN in the normal fashion.

Presently, typical modems used to communicate over the public telephone system (one present standard for such communications is detailed in the International Telecommunication Union, Telecommunication Standardization Sector ("ITU-T") Recommendation V.34 (1994)), represent binary data by an analog waveform that is modulated in response to the binary data. The waveform is in turn analyzed at a receiving modem to recover the binary data. For modem signals transmitted over the public telephone system, such analog waveforms are treated by central office switches as if the waveforms were analog voice signals.

FIG. 1 shows a typical communication system presently used for data communication. The basic elements of the subscriber loop connection are a modem 62 that is connected by an analog line 64 to a local switch 66, which terminates the switched digital telephone network 60. The modem 62 is typically located at the subscriber's premises and includes a receiver 68 and transmitter 70. As shown in FIG. 1 the receiver 68 and the transmitter 70 are coupled to the analog line 64 by a hybrid 72. The transmitter 70 converts input digital data 74 into analog signals that are passed through the hybrid 72 and transmitted over the analog line 24 to the local switch 66. Likewise, the receiver 68 converts input analog signals, which pass from the analog line 24 through the hybrid 32, into digital data 36.

At the local switch 66 end of the subscriber loop, analog signals from the line 64 are directed through a hybrid 78 to an analog-to-digital converter 80. The analog-to-digital converter 80 samples the analog signals converting them into a digital data stream for transmission through the switched digital telephone network 60. For transmission in the opposite direction, a digital data stream is applied from the digital telephone network 60 to a digital-to-analog converter 82. The digital-to-analog converter 82 converts the data stream into analog signals that are passed through to the hybrid 78 to the analog line 64, for transmission to the appropriate subscriber.

Typically, the waveforms are digitized into eight bit octets by a codec A/D converter at the central office, and the octets are transmitted in digital format between central offices until they are converted back to an analog signal by a D/A codec at the central office that is connected to the receiving subscriber loop. The data rate attainable by a modem operating in such an environment is limited by numerous factors including, in particular, the codec sample rate and the number and spacing of quantization levels of the codec convertors at the central office switches.

The effect on an analog signal associated with sampling the signal amplitude and representing the sample by one of a finite number of discrete (digital) values is generally referred to as quantization noise. Most telephone switches utilize voice codecs that perform nonlinear A/D and D/A conversions known as $\mu$-law or A-law conversion. In these conversion formats, the 8-bit codec codewords, also referred to as octets, represent analog voltages that are nonlinearly spaced. This type of conversion performs well for voice signals intended for a human listener (especially when transmitted over a noisy line), but have a negative impact on modulated analog waveforms associated with modems. Specifically, codecs that adhere to these standard nonlinear conversion formats implement nonlinearly spaced quantization levels, and have the effect of increasing quantization noise which is detrimental to modem signals.

The method and apparatus described herein is for use in a system for conveying digital data across a digital telephone switch to an analog subscriber, where a data source at one end of the link is connected directly to the digital telephone network (DTN) without undergoing an analog-to-digital conversion. At the other end of the link, the analog subscriber is connected to the telephone network in the standard fashion. This type of system may operate at data rates much higher than systems whose signals undergo an analog-to-digital conversion of a transmitted analog signal and a subsequent digital-to-analog conversion at the receiving end, due at least in part to an associated decrease in quantization noise. In such a system, data is transmitted through the telephone switching network in a digital format (via, e.g., T1 lines) and is only converted to an analog voltage when it reaches the central office connected to the subscriber's local loop.

FIG. 2 shows a block diagram of such a data distribution system. The system includes a data source 10, or server, having a direct digital connection 20 to a digital telephone network (DTN) 30. A client 40 is connected to the DTN 30 by a subscriber loop 50 that is typically a two-wire analog line. The DTN routes digital signals from the data source 10 to the client's local subscriber loop without any intermediary analog facilities such that the only analog portion of the link from the server to the client is the client's local loop. The analog portion thus includes the channel characteristics of the local loop transmission line plus the associated analog electronics at both ends of the line. The only D/A converter in the transmission path from the server to the client is the one at the DTN end of the client's subscriber loop. For the reverse channel, the only A/D converter in the path from the client to the server is also at the telephone company's end of the client's subscriber loop.

The communications format used by the invention described herein is known as pulse amplitude modulation. Essentially, the codecs are used to generate the varying amplitude pulses that are sent over the subscriber loop. Each octet sent to the subscriber's local loop is converted to an analog voltage by the DTN's codec. Thus each octet may be used to generate a desired voltage amplitude during that time interval, until the next octet is received (presently, octets are transferred at a rate of 8 K Hz).

An impediment to using the full capacity of a data link that has direct digital access to the telephone system and that uses codec codewords to produce pulse amplitude modulation is that the DTN may periodically introduce errors in the binary data due to the use of what is known in the telecommunications industry as "robbed bit signaling" (RBS). Additionally, the noise level may prevent a receiver from being able to distinguish between all of the possible codec output levels.

SUMMARY OF THE INVENTION

Described herein is a method of encoding data into a digital sequence to be transmitted over the DTN so as to cause the DTN's codec to generate an M-ary signal in a manner that will facilitate efficient data transmission and recovery (decoding) by the distant end receiver, even in the presence of robbed-bit signaling (RBS).

The preferred embodiments provide an apparatus and method of converting blocks of binary data to a corresponding block of $M_1$-ary, $M_2$-ary, . . . , $M_n$ symbols using Multiple Modulus Conversion (MMC) to maximize the data rate, while minimizing the required Signal-to-Noise Ratio (SNR) to achieve a desired error rate, in a system having a transmitter connected to the DTN via direct digital access and a receiver connected over a conventional analog subscriber line.

A subset of codec codewords is used to represent the M-ary signals. For each time slot (symbol time) one of M separate octets are selected for transmission by the encoder, and the encoder's output is sent through the DTN to a subscriber loop codec. The value of M can vary among the different time slots. The analog output of the codec corresponds to M-level, or M-ary pulse amplitude modulation, because each of the transmitted octets is converted to one of M analog voltages at the DTN's codec before being communicated over the subscriber loop. The set of M levels is also referred to as a signal constellation, with the M different voltage levels referred to as signal points within the constellation.

This approach allows for tighter constellation packing and constellation balancing, so that a minimum number of constellation points are required for a given bit capacity, and the error rate is not dominated by any one symbol interval. The net result is a lowering of the required SNR to achieve a desired error rate.

BRIEF DESCRIPTION OF THE DRAWINGS

The preferred embodiment of the present invention is described with reference to the drawings wherein.

DETAILED DESCRIPTION OF THE PREFERRED EMBODIMENT

Figure 1:
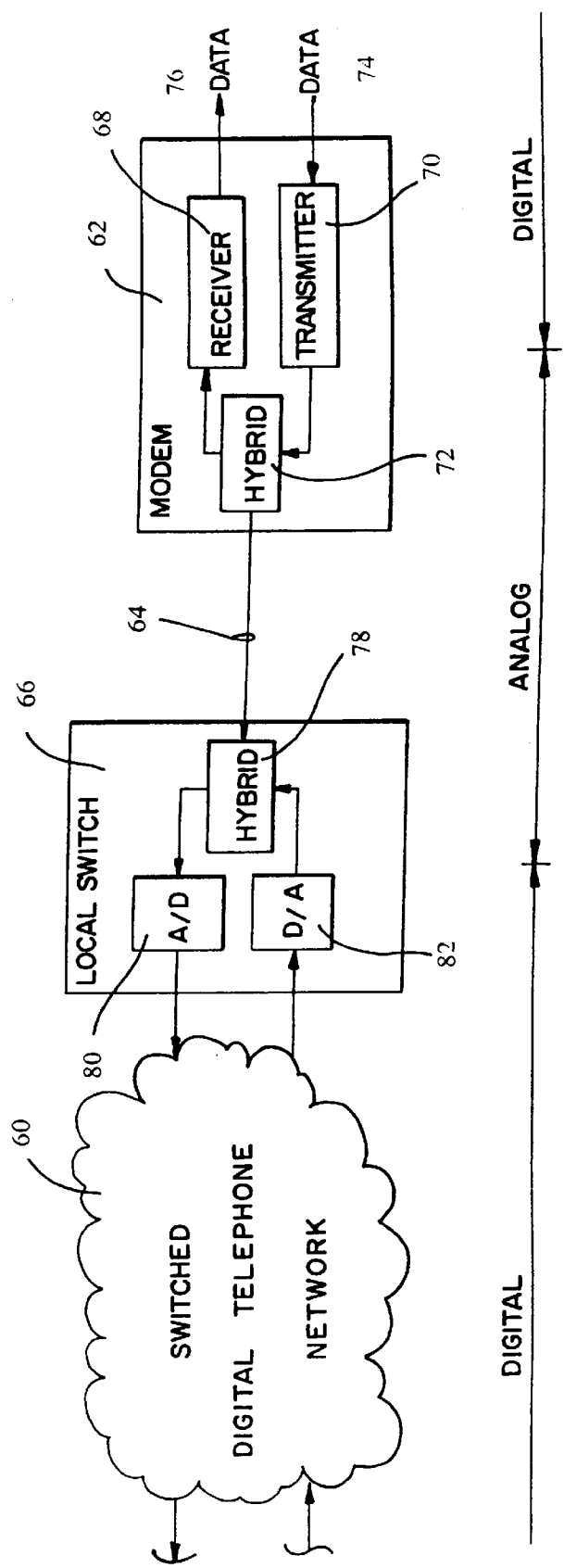
FIG. 1 is a block diagram of a standard modem communication system that utilizes the DTN.

In the system of FIG. 1, the server 10, having direct digital access to the DTN may be a single computer, or may include a communications hub that provides digital access to a number of computers or processing units. Such a hub/server is disclosed in U.S. Pat. No. 5,528,595, issued Jun. 18, 1996, and is incorporated herein by reference. Another hub/server configuration is disclosed in U.S. Pat. No. 5,577,105, issued Nov. 19, 1996, which is also incorporated herein by reference.

Figure 2:
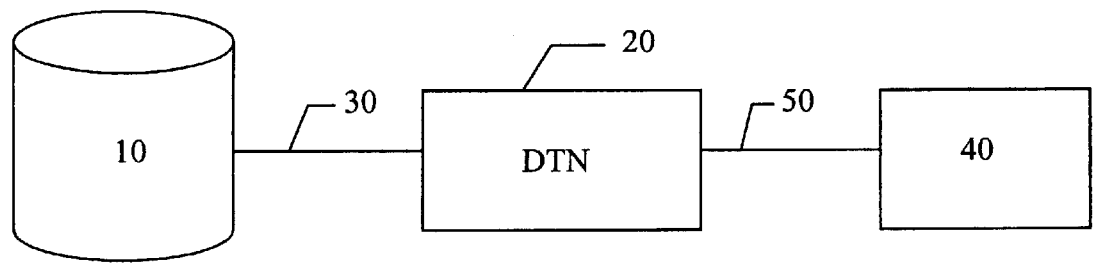
FIG. 2 is a block diagram of a direct digital access communication system.
Figure 3:
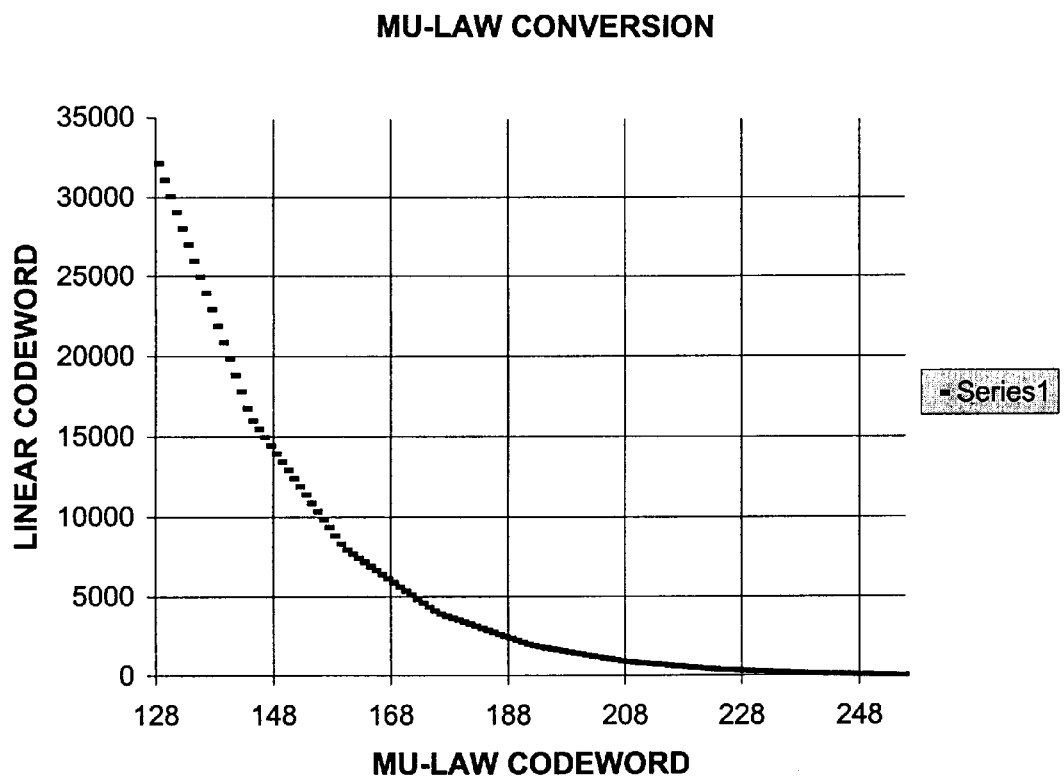
FIG. 3 shows the conversion between linear samples and $\mu$-law codewords for codewords 128–256.

In the system shown in FIG. 2, digital data can be input to the DTN as 8-bit bytes (octets) at the DTN's clock rate of 8 kHz. At the DTN's interface to the subscriber loop, the DTN's codec converts each byte to one of 255 analog voltage levels (two different octets each represent 0 volts) that are sent over the client's subscriber loop and received by a decoder at the client's location. As shown in FIG. 3, the analog voltages, or points, corresponding to the quantization levels are non-uniformly spaced and follow a generally logarithmic curve. In other words, the increment in the analog voltage levels produced from one codeword to the next is not linear, but depends on the mapping as shown in FIG. 3. Note that the vertical scale of FIG. 3 is calibrated in integers from 0 to 32,124. These numbers correspond to a linear 16 bit A/D converter. The table of FIG. 3 therefore generally represents the linear to $\mu$-law conversion. As is known to those of ordinary skill in the art, the sixteenth bit is a sign bit which provides integers from 0 to –32124 which correspond to octets from 0 to 127, not shown in FIG. 3. Thus FIG. 3 can be viewed as a conversion between the logarithmic binary data and the corresponding linear 16-bit binary data. It can also be seen in FIG. 3 that the logarithmic function of the standard conversion format is approximated by a series of 8 linear segments.

Figure 4:
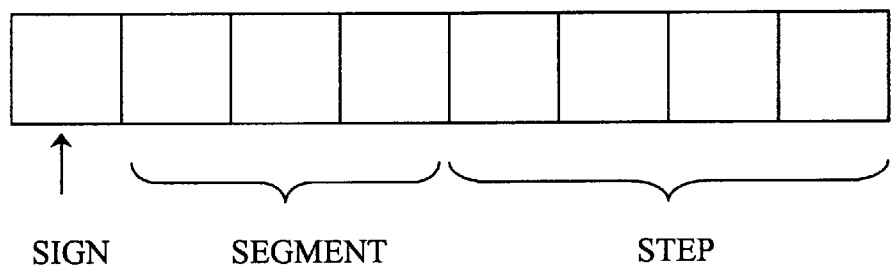
FIG. 4 shows the format of $\mu$-law codewords.

The conversion from octet to analog voltage is well known, and is based on a system called $\mu$-law coding in North America (and A-law coding in Europe). Theoretically, there are 256 points represented by the 256 possible octets, or $\mu$-law codewords. The format of the $\mu$-law codewords is shown in FIG. 4, where the most significant bit $b_7$ indicates the sign, the three bits $b_6$–$b_4$ represent the linear segment, and the four bits, $b_0$–$b_3$ indicate the step along the particular linear segment. These points are symmetric about zero; i.e., there are 128 positive and 128 negative levels, including two encodings of zero. Since there are 254 points not including zero, the maximum number of bits that can be sent per signaling interval (symbol) is just under 8 bits. Other factors, such as noise, digital attenuation (pads), channel distortion introduced by the subscriber loop, and the crowding of points at the smaller voltage amplitudes and the associated difficulty in distinguishing between them at the decoder/receiver, may reduce the maximum attainable bit rate.

Within the DTN, a supervisory signaling technique, called Robbed Bit Signaling ("RBS"), is utilized for call/data routing and control. On an RBS link, a least significant bit (lsb) of certain octets is appropriated, or "robbed", by the DTN in a periodic manner, and used to convey control information within the telephone system. The octets from different channels are typically framed in groups of twelve for transmission between switches within the DTN. On an RBS link, a central office switch robs the lsb of the codewords within every 6th and 12th time slot within each frame. The robbed bits are used to form a signaling, control and status channel to pass information between telephone network equipment. The customer whose data is carried by the DTN loses use of the lsb during those time slots.

Ordinarily, these channels are used for voice communications, and the bit robbing merely increases quantization noise of the effected time slots. This resultant distortion is barely perceptible to the human ear and thus is an acceptable technique of signaling. However, the above described data transmission system will in general suffer an unacceptable level of data errors on RBS circuits unless some coding method is devised to deal with the robbed bit problem. Furthermore, it is possible that more than one interval out of 6 has a bit robbed, if there are multiple hops over un-synchronized links. This invention was also developed to improve data communication performance on certain telephone network connections that utilize the RBS supervisory signaling technique.

A straightforward method for maintaining acceptable data error rates in the presence of RBS is to reduce the number of available points by one-half, such that the ambiguity introduced during RBS time slots is resolved at the receiver by interpreting two different received levels as the same transmitted code. In other words, of the 256 available points or codewords, only 128 of them would be used. At the receiver, two possible analog voltages may be received for each octet transmitted due to the ambiguity in the lsb. Each of these analog voltages would be decoded as the same symbol.

Unfortunately, this technique has the disadvantage of sacrificing one bit per symbol/per RBS interval, or 8 kbits/second/RBS interval. A more sophisticated and less costly technique is to encode the data such that the number of encoding levels is reduced only during the RBS time slots within a frame. This means that the encoder needs to know the positions of the robbed bit time slots, and needs to be capable of mapping binary data to fewer points during those slots than during the non-RBS slots. The preferred embodiments of the present invention relate to encoding and mapping the data at the server in a manner that minimizes the data rate penalty due to RBS, while minimizing the required SNR performance.

In order to provide flexible data rates, a preferred embodiment provides a method of sending a fractional number of bits per symbol, so as to achieve maximum data rate and minimum required SNR. In addition, it is desirable to mitigate the effects of RBS, such that the highest possible data rate is achieved. Both these requirements can be met with modulus conversion.

Constellations consisting of $M_i$ points are selected to meet the following three criteria:

1. $2^K \leq \prod_{i=1}^{n} M_i$, where K is the number of user bits to be transmitted in an n symbol frame.

2. Points in constellations used in rbs intervals, should be chosen such that the lsbs in their corresponding $\mu$-law codes are least effected by RBS. (Note these constellations will always be smaller than the ones used in non-rbs intervals, since less data is sent during this time.)

3. The probability of symbol error is minimized and balanced. Minimizing the probability of symbol error is accomplished by choosing points with maximal spacing, while constraining the points to have some specified average power. In addition, the number of points with minimum spacing should be minimized (smallest number of nearest neighbors). Balancing the symbol error probability, means that mutually, the M, should have about the same symbol error rate, since then the overall error rate (frame or block error rate, for example) will not be dominated by the symbol error rate of any one constellation.

The encoder first collects K bits to send during the n symbol frame. The following process, called Multiple Modulus Conversion, allows the K bits to be mapped to n indices, representing K/n bits/symbol (not necessarily an integer).

The next step of the conversion process is to represent the K bits as an integer, R, where:

$$R = b_0 + b_1 2 + b_2 2^2 + \ldots + b_{K-1} 2^{K-1}.$$  (eq. 2)

In eq.2, $b_0$ is the lsb and $b_{K-1}$ is the msb (most significant bit) of the K-bit data block. The number R may be represented as:

$$R = r_1 + r_2 M_1 + r_3 M_1 M_2 + \ldots + r_n M_1 M_2 \ldots M_{n-1}.$$

The result of the modulus conversion process is the production of the values $r_i$, i=1, . . . n. where the values of the $r_i$ are constrained to the interval: $0 \leq r_i < M_i$. The n values of $r_i$ correspond to codec codewords that will be converted to analog levels by the DTN D/A codec.

A simple algorithm can be used for generating the $r_i$, given the $M_i$ as follows:

For i=1, . . . , n
    $R = R/M_i$
    $Q = Int(R)$
    $F = R - Q$
    $r_i = M_i * F$
    $R = Q$
Next i The $r_i$ are indices to symbols that are conveyed by the encoder/server to the receiver by transmitting to the DTN the codewords corresponding to the appropriate points. The indices may be generated in other fashions, using similar algorithms, without departing from the spirit and scope of the invention.

Figure 5:
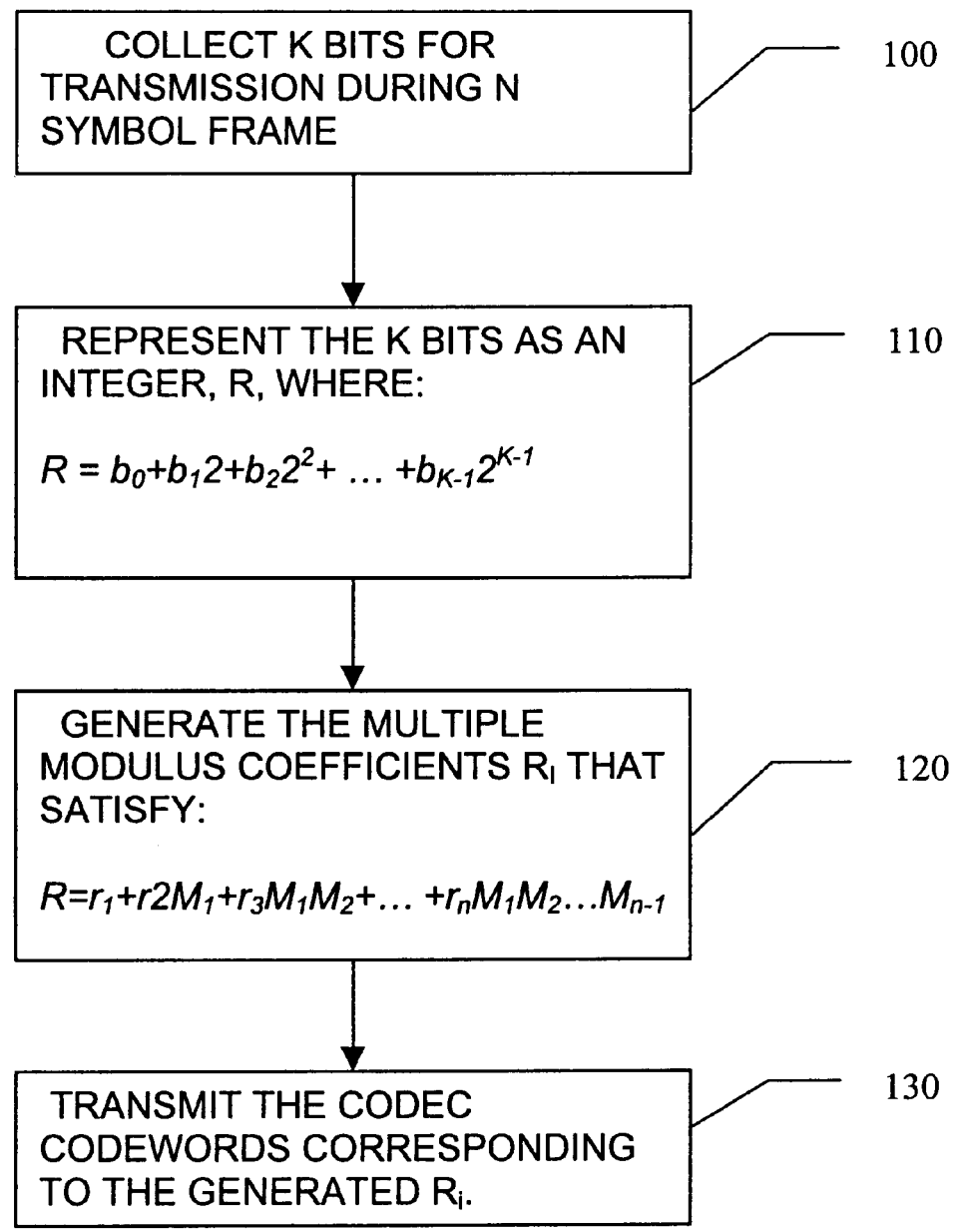
FIG. 5 shows a flow chart of one embodiment of Multiple Modulus Conversion.

FIG. 5 depicts the steps performed in converting the data bits to symbols. At step 100 the K bits are collected for transmission through modulus conversion. At step 110 the bits are converted to an integer value. At step 120 the integer is converted to multiple modulus indices by using the moduli $M_i$ values. At step 130, the multiple modulus indices are transmitted to the telephone network in the form of the corresponding codec codewords.

At the decoder, the process of decoding or recovering the data involves identifying the correct symbol indices $r_i$, from the analog voltages sent over the receiver's subscriber loop and then unmapping these indices through Reverse Multiple Modulus Conversion. One preferred method of decoding the symbols is to first restore the integer R from the recovered indices $r_i$. The following algorithm may be used:

R=0
For i=1, . . . , n
    $R = M_{n-i+1} * R + r_{n-i+1}$
Next i
From R, the K bits in the frame can be recovered.

According to the preferred embodiment of the present invention, the values of the $M_i$ and their corresponding constellation sets are ultimately determined in large part by the SNR of the channel. One of ordinary skill in the art can appreciate that the SNR can be determined in a number of ways, for example during an initialization period, a sequence of known codewords may be transmitted to produce a known sequence of symbols by the DTN's codec, and the variance from the expected symbols (points) is measured. Once the SNR is determined, a search method can be employed to determine the $M_i$'s and their corresponding constellations. The constellations are chosen from the DAC codes that satisfy the three criteria cited above. That is, search for n sets of points, corresponding to n symbols per frame, and having n moduli, which simultaneously minimizes the desired probability of symbol error, while satisfying the data rate criterion 1. One can use the following expression for a good approximation to the probability of symbol error when performing the constellation search:

$$P_e \cong \frac{N_\Delta}{M_i} Q(\Delta/2\sigma)$$

where $$Q(x) = \frac{1}{\sqrt{2\Pi}} \int_x^\alpha e^{-t^2/2} dt,$$

$N_A$ is the number of points with minimum spacing $\Delta$, and $\sigma$ is the noise standard deviation. Also, one needs to account for the number of points with spacing $\Delta$, which can be handled as a multiplicative factor times the probability of error.

One advantage of MMC is that it allows a non-integer number of bits to be mapped to each symbol, which increases efficiency, because the constellation sizes are not restricted to powers of two (i.e, a fractional number of bits/symbol are allowed). As a specific example, in a system having one RBS link, the block of data is converted to a multi-digit modulo-$M_1$ number (where each digit represents an $M_1$-ary symbol) followed by a single digit modulo-$M_2$ number (representing an additional $M_2$-ary symbol). The concatenated symbols, or digits of the modulo-$M_1$ and modulo-$M_2$ numbers, are then transmitted in binary format as eight-bit bytes, or octets, through the telephone system where each octet represents a symbol. At the local loop on the receiver end of the link, the telephone system converts the octets to analog voltages corresponding to the $M_1$-ary and $M_2$-ary symbols. The block of symbols may then be decoded by a reverse modulus conversion to recover the binary data.

Figure 6:
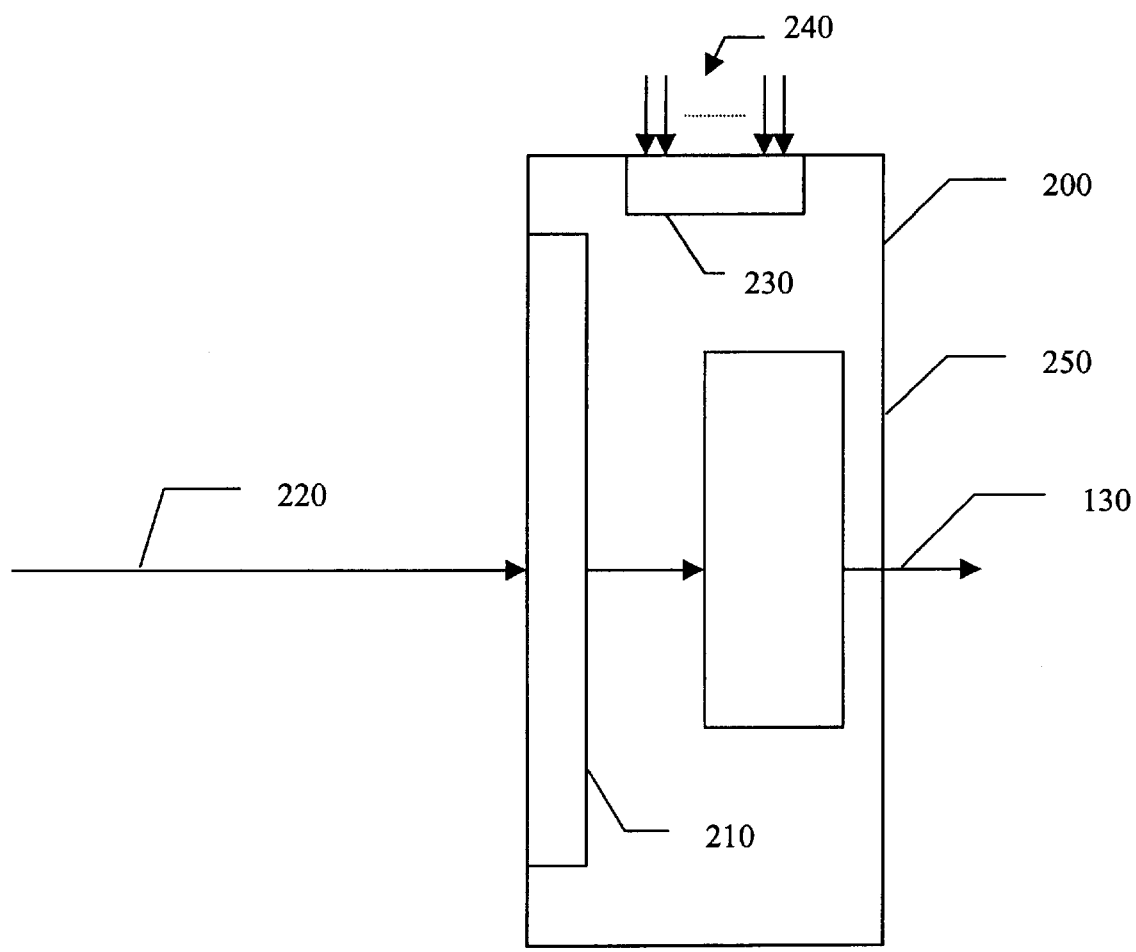
FIG. 6 shows a Multiple Modulus Converter.

FIG. 6 depicts a modulus converter 200 for encoding information bits for transmission. The converter includes an input buffer 210 for accepting a block of data bits received on line 220, and at least one modulus buffer 230 for storing the modulus values 240. Alternatively, multiple buffers may be provided in the case of multiple modulus conversion. A processing unit 250 is connected to the input buffer 210 and the modulus buffer(s) 230. The processing unit 250 converts the data bits to symbols using the modulus value(s) 240. The converter 200 then outputs the symbols to the telephone system on output 130. The output 130 is preferably a port of a microprocessor. The modulus converter preferably has six modulus buffers, one for each modulus value (corresponding to each time slot of a six-slot frame). The modulus converter's processing unit 250 is preferably a microprocessor, or digital signal processor. The buffers 210 and 230 are preferably random-access memory (either on-chip, or in associated RAM chips). Alternatively, the conversion function may be implemented in an application specific integrated circuit, having optimized conversion logic and hardware buffers.

A further embodiment of the modulus conversion method involves combining modulus conversion with a technique commonly called shell mapping, and the combined method may be referred to as Multiple Modulus Shell Mapping (MMSM). MMSM provides a frame mapping technique that uses Multiple Modulus Conversion (MMC) and Shell Mapping (SM) to map data bits to a sequence of data symbols, or points. The MMSM apparatus includes a shell mapper to generate ring indices from a first block of K data bits, and a modulus converter to select the signal points from within the ring based on a block of B data bits. MMSM permits the use of constellations having any integer number of points per ring. MMSM also accommodates variations in the constellations from time-slot to time-slot within a frame. The number of rings in each constellation preferably remains constant, but the moduli vary. MMSM produces $d_{min}$ equal to the best of MMC and SM, and in some cases $d_{min}$ may be better than that for either MMC or SM. Further details of MMSM may be found in U.S. patent application Ser. No. 08/888,201, entitled "Improved Signaling Method Using Multiple Modulus Shell Mapping", filed Jul. 7, 1997, the contents of which are incorporated herein by reference.

A further embodiment of modulus conversion method involves the use of a DC compensation scheme for preventing a DC offset voltage from accumulating. Generally, the method includes defining a frame that includes at least two unsigned codewords generated by multiple modulus conversion, i.e., the codewords do not include sign bits. An unsigned codeword is then identified within the frame by applying a rule to the codewords, for example, the largest magnitude codeword may be selected. Next, a sign bit is appended to the identified unsigned codeword, thereby producing a DC compensating codeword. The sign bit may be selected based upon a weighting function applied to the linear values associated with the previously transmitted codewords. The remaining unsigned codewords have sign bits appended from a pool of user data bits.

Additionally, an encoder having an improved DC compensator is provided. The encoder includes a converter that is coupled to the DC compensator. The DC compensator includes a storage device for storing a stream of unsigned codewords and a sorting device for sorting the stored codewords. The sorting device is operable to identify a selected codeword from the stored codewords in accordance with a rule. The DC compensator also includes a combiner means for appending a sign bit to the selected codeword, thereby forming a compensating codeword. Further aspects of the DC compensation scheme may be found in U.S. patent application Ser. No. 08/871,220, entitled "Frame-Based Spectral Shaping Method And Apparatus", filed Jun. 9, 1997, the contents of which are incorporated herein by reference.

Preferred embodiments of the present invention have been described herein. It is to be understood, of course, that changes and modifications may be made in the embodiment without departing from the true scope of the present invention, as defined by the appended claims.

We claim:

1. A method for transmitting digital information from a data source having direct access to a digital telephone system for supplying binary codewords directly to the digital telephone system, to a receiver connected to said digital telephone system by an analog subscriber line, wherein the digital telephone system converts the binary codewords from the data source to analog voltage levels for transmission to the receiver, the method comprising the steps of:

selecting a number of symbol periods, n, in a frame, where n is a multiple of six;

selecting at least one block of information bits to be transmitted in said frame, wherein said at least one block comprises K bits;

selecting at least one set of symbols for each of said n symbol periods wherein the number of symbols in each said set corresponds to a modulus M of said symbol period, and wherein each said symbol corresponds to a binary codeword, and wherein said set of symbols for each said n symbol periods is in part selected in response to the presence of robbed bit signaling;

mapping said at least one block of information bits to said symbols by multiple modulus conversion; and providing said codewords to the digital telephone system.

2. The method of claim 1 wherein said modulus M varies between at least two of said symbol periods.

3. The method of claim 1 wherein n is a multiple of 6.

4. A method of encoding information bits for transmission over a digital telephone system where an encoder has direct digital access to the digital telephone system, and wherein said digital telephone system appropriates bits during known bit-robbed rate time slots, comprising the steps of:

providing desired moduli values, $M_1, M_2, \ldots, M_n$ for n time periods wherein said moduli values are selected in response to the presence of robbed bit signaling;

providing n sets of binary codewords that define n sets of symbols;

mapping information bits to said binary codewords selected from said n sets of symbols using said moduli values; and providing said codewords to said digital telephone system.

5. The method of claim 4 where the moduli values of $M_1, M_2, \ldots, M_n$ are such that $$\prod_{i=1}^{n} M_i \geq 2K,$$

where K is the number of bits converted to symbols.

6. A method of decoding data symbols transmitted over a digital telephone system where an encoder has direct digital access to the digital telephone system for providing binary octets to the digital telephone system, and wherein said digital telephone system appropriates bits from said octets during known bit-robbed time intervals, and wherein said digital telephone system converts the octets to analog voltages, comprising the steps of:

defining a transmission frame having transmission time intervals;

selecting n sets of symbol codewords where each set corresponds to a particular said transmission time interval, and wherein the number of codewords in each said set is selected in response to the presence of robbed bit signaling in the corresponding said transmission time interval;

receiving analog voltages representing symbols to be decoded; and converting said received symbols to a block of binary data using multiple modulus conversion.

7. A modulus converter for encoding information bits for transmission over a digital telephone system where an encoder has direct digital access to the digital telephone system, and wherein the digital telephone system appropriates bits during known bit-robbed rate time slots, comprising:

an input buffer for accepting a block of data bits;

a plurality of modulus buffers for storing a plurality of modulus values, at least one of said modulus values being other than a power of two, and wherein at least one of said modulus values is selected in response to the presence of robbed bit signaling in the digital telephone system;

a processing unit connected to said input buffer and said plurality of modulus buffers, for converting said block of data bits to symbols using said plurality of modulus values; and an output connected to said processing unit for communication said symbols to the digital telephone system.

8. The modulus converter of claim 7 wherein said plurality of modulus buffers comprises six modulus buffers, wherein each of said six modulus buffers is adapted for storing a corresponding modulus value.

9. The modulus converter of claim 7 wherein said processing unit is a microprocessor.

10. The modulus converter of claim 7 wherein said input buffer is a random-access memory register.

11. The modulus converter of claim 7 wherein each of said plurality of modulus buffers is a random-access memory register.

* * * * *